May 28, 1963    M. PEQUIGNOT    3,091,577
DEVICE FOR THE EXTREME PURIFICATION OF WATER OR OTHER LIQUID
Filed May 25, 1959
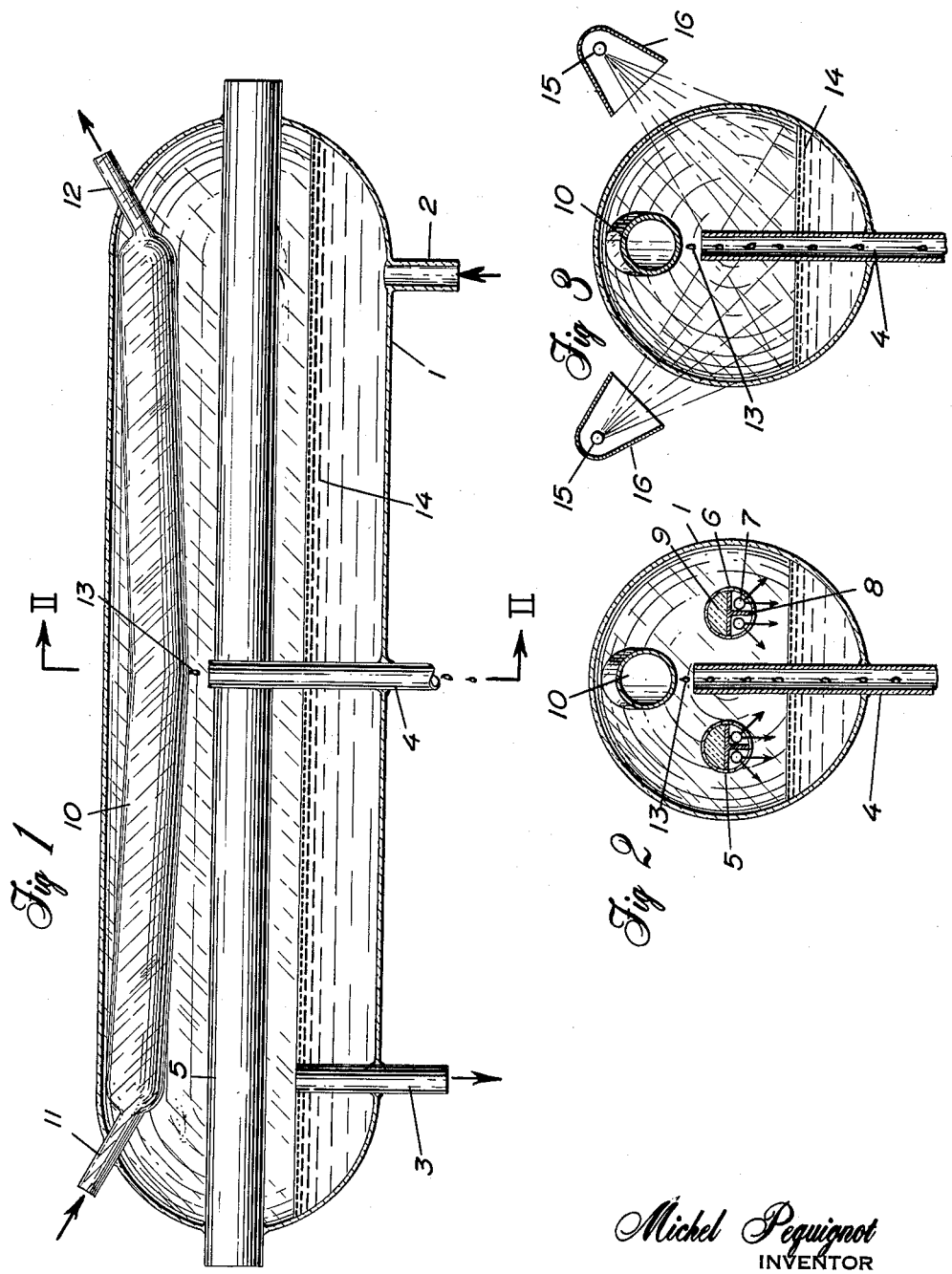
Michel Pequignot
INVENTOR
BY Irwin S. Thompson
ATTORNEY United States Patent Office 3,091,577
Patented May 28, 1963

3,091,577
DEVICE FOR THE EXTREME PURIFICATION OF WATER OR OTHER LIQUID
Michel Pequignot, Malakoff, France
(184 Rue Nationale, Paris 13, France)
Filed May 25, 1959, Ser. No. 815,378
Claims priority, application France June 4, 1958
4 Claims. (Cl. 202—139)

It is known that difficulties are involved in obtaining absolutely pure water, that is to say water which is free from mineral salts or other impurities in quantities less than 1 gamma (microgram) per liter. To an increasing extent, however, the use of water having this degree of impurity is becoming absolutely indispensable both in the laboratory or in industry. Such is particularly the case in spectrophotometry, in the manufacture of semiconductors intended for electronic applications, with respect to certain researches or certain biological treatments, etc. A number of methods have been suggested for this purpose.

In order to obtain such a complete purification, it has been proposed to employ resins of the ion-exchanger type. This method has given good results in the elimination of impurities in the ion state. But it has proved unreliable insofar as carbon compounds are concerned. Furthermore, the effectiveness of the resins decreases rapidly after a certain period of use to the extent that it becomes necessary to make frequent tests on the purified water. The degree of purity required is such that tests of this nature are costly and take a long time. Finally the biological neutrality of resins has not yet been definitely established, thus preventing these from being employed in a number of cases.

The method which gives the most reliable results in practice is actually that which consists in carrying out a double distillation in devices of quartz or silica glass. Silica glass is in fact practically insoluble in water. In the following description and in the appended claims, the term "silica glass" refers to pure silica (silicon dioxide, $SiO_2$) melted or softened at extremely high temperatures (above 1700° C.) to a viscous liquid resembling melted glass, which can then be drawn or fashioned into any desired shape to form a water insoluble member. See, for example, Textbook of Chemistry, Edward Mack, Jr., et al., Ginn and Co., 1949, pages 738–740. Repeated distillation eliminates the disadvantages of the entrainment phenomena of simple distillation.

In fact it becomes possible in this manner to obtain very pure water characterised by the following criteria:

The electrical resistivity measured after elimination of the carbon dioxide or other gases liable to alter the resistivity according to the method described by J. Kendall (Journal of American Chemical Society, vol. 38, July 1956, page 1480) is greater than $2.10^{-6}$ ohms per cubic cm.

The dithizone test according to the method described by G. Iwantcheff in his work: "Dithizone and its Use in Microanalysis and in the Analysis of Traces" (1st Edition, page 50), published by German editor Verlag Chemie in 1958.

Although this method enables the required degree of purity to be obtained, it is limited in its applications by the cost of the silica devices. In fact, it is only put into operation by devices having a small rate of delivery of the order of 1 liter per hour at the maximum, while the cost of apparatus required for higher rates of flow is prohibitive.

Alternatively, these higher rates of flow are provided by a number of double distillation devices operating in parallel; but this method of operation makes it necessary to regroup the water purified by the various devices and a regrouping process of this nature entails the risk of contamination.

The present invention has for its object a device which enables these disadvantages to be overcome and permits considerable rates of flow to be obtained without the need for costly equipment.

This device is constituted by a vessel having an overflow which limits the level of the liquid and comprises a source of infra-red radiations directed on the free surface of the liquid and provided with a cold condensation surface.

It is characterised in that the cold condensation surface is a tubular element of silica glass or of fused quartz which passes across the vessel above the liquid, a cooling fluid being circulated through the tubular element.

In this device, by means of infra-red radiation the evaporation of the liquid is effected without bringing it to the boil and therefore without the entrainment of droplets which are one of the main causes of introduction of impurities in the products of condensation. When these products of condensation are in contact with the silica glass condenser, which is totally insoluble, they are not liable to become contaminated by dissolving salts or metal.

By means of this device, a single operation is sufficient to obtain absolutely pure water. As a safety measure, a second operation may be carried out with water which has already been purified, this resembling a kind of double distillation. But while this double operation is a necessity in distillation, experience shows that it serves no purpose in conjunction with the device according to the invention, since the required purity is at once obtained without any need to repeat the process of operation and a second treatment produces no appreciable improvement. Considerable simplification is consequently obtained.

On the other hand, while the condenser which is in contact with the evaporated water has to be made of quartz, the other parts of the device such as the container and radiation emitters may be of ordinary glass or other material. No difficulty is encountered in the construction of apparatus of substantial size which directly delivers the required quantities of purified water without harmful regroupings.

Methods of treatment of liquid making use of evaporation are doubtless already known. But these methods are often employed to pour off the liquid in a thin layer and under a vacuum; this is particularly the case in "molecular distillation." The invention essentially differs from this process by the fact that the evaporation is carried out on a mass having considerable thickness and also due to the fact that it is carried out at atmospheric pressure without special arrangements.

The method of the invention is more particularly contemplated for the purification of water, but it is applicable to other liquids, and in particular to mercury, though obviously in a non-oxidizing atmosphere (barometric vacuum or neutral gas). It is in the purification of water, which entails the greatest difficulties, that the advantages of the present method are the most marked.

The accompanying drawings, which are given by way of example and not by way of implied limitation, represent a form of embodiment of a device for the operation of the invention.

FIG. 1 is a longitudinal cross-section.

FIG. 2 is a transverse cross-section taken along the line II—II of FIG. 1.

FIG. 3 is a transverse cross-section of an alternative form.

This device consists of a cylindrical vessel 1 with a convex bottom and which may be of quartz or simply of glass. This vessel is provided at 2 with a tube for the admission of the water to be purified and at 3 with an evacuation overflow. In its central portion it is provided with a tube 4 which receives the purified water and pours it off externally. This tube is raised considerably higher than the level of the liquid in the vessel and cooperates with the condenser as will be explained below.

In the vessel 1 are inserted infra-red radiation emitters 5.

These emitters may be of any type: electrical resistances inside a transparent tube, filament lamp, infra-red gas tube etc. In the example shown, these emitters are constituted by two tubes 6 of quartz each comprising two resistances 7 separated by an insulating member 8 of silica or steatite, the upper portion 9 being provided with a heat insulation such as glass wool or the like.

On the upper portion of the vessel 1 is mounted the condenser constituted by a tube 10 with a very wide flare and having a double slope and tubes 11 and 12 respectively provided for the admission and delivery of the cooling fluid, for example cold water. The central portion of the tube 10 is provided beneath the tube with an extension 13 which is placed above the tube 4. The tube 10 constituting the condenser is of quartz or silica glass.

The device should preferably be supplied with water which has previously been exchanged or distilled in a device of standard type. This precaution is necessary if it is desired to avoid the need for repeated cleaning. The water thus prepared is conveyed through 2 into the vessel at a suitable rate of flow so as not to disturb the tranquillity of the free surface 14, the level of which is regulated by the overflow tube 3.

The emitters 5 send an infra-red radiation onto the free surface 14 thus causing the water to evaporate. This radiation is regulated so as not to cause the water to boil. An intensity which does not exceed 8 watts per sq. cm. is suitable.

The water which has been evaporated and purified rises in the vessel 1 and comes into contact with the tube 10 through which cold water passes, by circulating for example from 11 to 12. The vapor condenses in contact with the cold wall of the tube 10 and streams down this latter. It then collects at 13 where the point provided at this place assists the dripping of the condensed vapor into the tube 4 at the lower extremity of which the perfectly purified water is collected.

Instead of being placed in the interior of the device as shown in FIGS. 1 and 2, the source of infra-red radiation may be placed outside the device as shown in FIG. 3. This arrangement is particularly advantageous when the vessel 1 is constructed of a material which permits the infra-red radiation to pass without absorption, particularly if the vessel 1 is of quartz. In this case the sources 15 of radiation are provided outside the vessel 1 with a reflector 16 which guides the rays onto the free surface 14 of the water contained in the vessel 1.

By means of a device of this type which operates at atmospheric pressure, pure water is obtained directly and without re-treatment. On starting the operation, this pure water is obtained much more rapidly than with double distillation devices which only produce perfectly pure water after the large number of hours of operation required to ensure initial cleaning of the devices. By means of the device which has been described, this starting period is substantially reduced.

A device of the kind described, having a diameter of 100 mm. and a length of 500 mm., thus taking up a small amount of space and equipped with two 1,000 watt resistances, is capable of delivering a rate of flow of pure water of 1,500 cu. cms. per hour.

What I claim is:

1. A distilling device for purifying water to an impurity content less than 1 microgram per liter comprising a cylindrical vessel supporting the water to be purified having a horizontal axis, an admission tube mounted in said vessel to admit water therein, an overflow tube mounted in said vessel and displaced both horizontally from and vertically above said admission tube for maintaining the surface of the water in said vessel at a predetermined level, a longitudinal tubular condenser of a material selected from the group consisting of water insoluble silica glass and quartz, said condenser being formed by a single tube having an input and an output for supplying cooling liquid continuously thereto mounted in said vessel above the level of the water, said condenser arranged in the form of a V to concentrate the condensed water thereat, a receiver tube mounted in said vessel just below the apex of said V to collect the water condensed on said condenser and concentrated at the apex of said V, and an infrared heating means disposed above the level of the water for directing radiation onto and heating the surface of the water.

2. A distilling device according to claim 1 wherein said heating means consists of resistances mounted in a tubular member disposed in and along the entire length of said vessel between the level of the water and said condenser.

3. A distilling device according to claim 1 wherein said heating means consists of resistances mounted in reflector means and disposed outside of and along the entire length of said vessel.

4. An apparatus for distilling water in order to obtain water of a very high purity containing less than 1 microgram of impurities per liter, comprising a cylindrical vessel supporting the water to be distilled with a horizontal axis and having an inlet and an overflow, infrared heating means radiating onto the free surface of the water within said vessel, a condenser, and collecting means for the condensed water, said condenser comprising a single tube of a material selected from the group consisting of water insoluble silica glass and quartz, said tube extending longitudinally across said vessel, said tube having a V-shape the point of which is disposed above said collecting means, and said radiating heating means extending longitudinally inside said vessel and over the whole length thereof.

References Cited in the file of this patent

UNITED STATES PATENTS

| | | |
|---|---|---|
| 577,267 | Painter | Feb. 16, 1897 |
| 803,887 | Falk | Nov. 7, 1905 |
| 1,237,079 | Mellgren | Aug. 14, 1917 |
| 1,419,008 | Baum | June 6, 1922 |
| 1,864,021 | Jack | June 21, 1932 |
| 1,893,340 | Schlumbaum | Jan. 3, 1933 |
| 2,357,286 | Reavell | Sept. 5, 1944 |
| 2,398,842 | Morse | Apr. 23, 1946 |
| 2,486,684 | Schlesman et al. | Nov. 1, 1949 |
| 2,538,957 | Askevold et al. | Jan. 23, 1951 |
| 2,658,984 | Mohn | Nov. 10, 1953 |

FOREIGN PATENTS

| | | |
|---|---|---|
| 561,110 | Great Britain | May 5, 1944 |